(12) United States Patent
Wyatt et al.

(10) Patent No.: US 12,321,901 B2
(45) Date of Patent: Jun. 3, 2025

(54) SYSTEMS AND METHODS FOR PERFORMING REPAIRS TO A VEHICLE

(71) Applicant: State Farm Mutual Automobile Insurance Company, Bloomington, IL (US)

(72) Inventors: Amber Wyatt, Bloomington, IL (US); Chris Ray, Bloomington, IL (US); Ashish Sawhney, Bloomington, IL (US); Tim Husarik, Normal, IL (US); Jose Gonzalez, Hialeah, FL (US); Tracey M. Herring, Lilburn, GA (US); Holly Lambert, Ashburn, GA (US); Stephen Tinglestad, Mesa, AZ (US); Jason Beckman, Bloomington, IL (US); Andrea Foster, Dunwoody, GA (US); John Freymann, Normal, IL (US); Shane Tomlinson, Bloomington, IL (US); Akilah Hugine, Roswell, GA (US); Daniel Green, Dubuque, IA (US); Eric Brown, Dunwoody, GA (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 18/069,059

(22) Filed: Dec. 20, 2022

(65) Prior Publication Data
US 2023/0123916 A1 Apr. 20, 2023

Related U.S. Application Data

(63) Continuation of application No. 16/169,547, filed on Oct. 24, 2018, now Pat. No. 11,587,046.
(Continued)

(51) Int. Cl.
*G06Q 10/20* (2023.01)
*G06F 16/9537* (2019.01)
(Continued)

(52) U.S. Cl.
CPC ........ *G06Q 10/20* (2013.01); *G06F 16/9537* (2019.01); *G06Q 40/08* (2013.01);
(Continued)

(58) Field of Classification Search
None
See application file for complete search history.

(56) References Cited

U.S. PATENT DOCUMENTS

| | | |
|---|---|---|
| 7,239,350 B2 | 7/2007 | Ban |
| 7,636,676 B1 | 12/2009 | Wolery |

(Continued)

FOREIGN PATENT DOCUMENTS

| | | |
|---|---|---|
| EP | 3239686 A1 | 11/2017 |
| EP | 3578433 B1 | 8/2020 |

(Continued)

*Primary Examiner* — Jan P Mincarelli
(74) *Attorney, Agent, or Firm* — Armstrong Teasdale LLP

(57) ABSTRACT

A system for instructing a user on repairing a vehicle configured to (i) receive, from the user, a request to repair a vehicle, including information about the vehicle; (ii) present, to the user via a user computer device, a user interface to allow the user to search for a repair facility to repair the vehicle; (iii) receive, from the user via the user interface, a selection of a repair facility; (iv) determine whether the selected repair facility is a select service location, where a select service location is a pre-authorized repair facility; and (v) if the selected repair facility is a select service location, transfer the information about the vehicle to a computer device associated with the selected repair facility.

22 Claims, 9 Drawing Sheets

Related U.S. Application Data

(60) Provisional application No. 62/576,704, filed on Oct. 25, 2017.

(51) Int. Cl.
*G06Q 40/08* (2012.01)
*G06V 20/10* (2022.01)
*G07C 5/08* (2006.01)

(52) U.S. Cl.
CPC ......... *G06V 20/182* (2022.01); *G07C 5/0808* (2013.01); *G07C 5/0841* (2013.01)

(56) References Cited

U.S. PATENT DOCUMENTS

| | | |
|---|---|---|
| 8,135,804 B2 | 3/2012 | Uyeki |
| 8,260,639 B1 | 9/2012 | Medina, III |
| 9,228,834 B2 | 1/2016 | Kidd |
| 9,508,200 B1 | 11/2016 | Mullen |
| 9,824,453 B1 | 11/2017 | Collins |
| 9,830,748 B2 | 11/2017 | Rosenbaum |
| 9,990,782 B2 | 6/2018 | Rosenbaum |
| 9,996,878 B1 | 6/2018 | Fox |
| 10,269,190 B2 | 4/2019 | Rosenbaum |
| 10,354,230 B1 | 7/2019 | Hanson |
| 10,467,824 B2 | 11/2019 | Rosenbaum |
| 11,227,452 B2 | 1/2022 | Rosenbaum |
| 11,407,410 B2 | 8/2022 | Rosenbaum |
| 11,524,707 B2 | 12/2022 | Rosenbaum |
| 11,594,083 B1 | 2/2023 | Rosenbaum |
| 2008/0162199 A1 | 7/2008 | Smith |
| 2009/0089134 A1 | 4/2009 | Uyeki |
| 2009/0106036 A1 | 4/2009 | Tamura |
| 2009/0138290 A1 | 5/2009 | Holden |
| 2010/0250289 A1 | 9/2010 | Weaver |
| 2011/0137745 A1 | 6/2011 | Goad |
| 2012/0297337 A1 | 11/2012 | St. Denis |
| 2013/0021512 A1 | 1/2013 | Patuck |
| 2013/0339062 A1 | 12/2013 | Brewer |
| 2015/0095086 A1 | 4/2015 | Gopinath |
| 2015/0106133 A1 | 4/2015 | Smith, Jr. |
| 2015/0278893 A1 | 10/2015 | Taylor |
| 2017/0124525 A1 | 5/2017 | Johnson |
| 2017/0147991 A1 | 5/2017 | Franke |
| 2017/0293894 A1 | 10/2017 | Taliwal |
| 2017/0352011 A1 | 12/2017 | Sells |
| 2018/0025392 A1 | 1/2018 | Helstab |
| 2022/0092893 A1 | 3/2022 | Rosenbaum |
| 2022/0340148 A1 | 10/2022 | Rosenbaum |
| 2023/0060300 A1 | 3/2023 | Rosenbaum |

FOREIGN PATENT DOCUMENTS

| | | |
|---|---|---|
| EP | 3730375 B1 | 10/2021 |
| EP | 3960576 A1 | 3/2022 |
| EP | 4190659 A1 | 6/2023 |
| EP | 4190660 A1 | 6/2023 |

SYSTEMS AND METHODS FOR PERFORMING REPAIRS TO A VEHICLE

RELATED APPLICATIONS

This application is a continuation of U.S. patent application Ser. No. 16/169,547, filed Oct. 24, 2018, entitled, "SYSTEMS AND METHODS FOR PERFORMING REPAIRS TO A VEHICLE," which claims priority to U.S. Provisional Patent Application No. 62/576,704, filed Oct. 25, 2017, entitled "SYSTEMS AND METHODS FOR PERFORMING REPAIRS TO A VEHICLE," the entire contents and disclosure of which are hereby incorporated by reference herein in their entirety.

FIELD OF THE INVENTION

The present disclosure relates to repairing damage to a vehicle and, more particularly, to a network-based system and method for instructing a user on repairing a vehicle.

BACKGROUND

In most cases of damage to a vehicle, the damage must be reviewed by an individual, such as an appraiser, to determine a cost to repair the damage. This may be done to inform the owner of the vehicle on how much it will cost to repair, or to inform an insurance provider of the cost to repair. In order to determine the cost to repair the owner of the vehicle must either transport the vehicle to the appraiser for inspection, or the appraiser must travel to the vehicle. Depending on the amount of damage to the vehicle, it may not be worthwhile to require either the owner or the appraiser to travel for the inspection. Furthermore, in some cases the appraisers are repair shops that may or may not have capacity to repair the vehicle at the time of the appraisal. Thus, after getting the appraisal, the owner may have to return with the vehicle or take it elsewhere to get it repaired. There exists a need to automate this process to reduce the need for travel and improve the speed of this process.

BRIEF SUMMARY

The present embodiments may relate to systems and methods for instructing a user on repairing a vehicle. The system may include a repair assistant (RA) computer system, one or more insurer network computer devices, one or more user devices potentially associated with at least one camera, and/or one or more repair facility computer devices. The RA computer system may be associated with an insurance network or may be merely in communication with an insurance network.

The RA computer system may be configured to: (i) receive, from the user, a request to repair a vehicle, including information about the vehicle, where the user interface is associated with an application on the user computer device, and where the user logs into the application to make the request to repair, where the information about the vehicle includes one or more of a make of the vehicle, a model of the vehicle, a year of the vehicle, a location of the damage on the vehicle, identification of the vehicle, identification of the user, and one or more photographs of the vehicle; (ii) in response to the request to repair, transmit, to the user computer device, a link to the user interface, where the link is transmitted in at least one of a short message service (SMS) message, a multimedia messaging server (MMS) message, and an email message; (iii) present, to the user via the user computer device, a user interface to allow the user to search for a repair facility to repair the vehicle; (iv) receive, from the user via the user interface, a search request including a name of a repair facility; (v) request that the user reenter the name of the repair facility if the name is not recognized; (vi) query one or more databases to recognize the repair facility based on the name; (vii) if the name is recognized, retrieve, from the one or more databases, facility information about the repair facility; (viii) determine, via the one or more databases, whether the repair facility is a select service location based on the facility information; (ix) receive, from the user via the user interface, a search location for a repair facility, where the search location includes at least one of an address, a zip code, a municipality, and a present location of the user computer device; (x) query, one or more databases, to determine a plurality of repair facilities within a predetermined distance of the search location; (xi) filter the plurality of repair facilities to generate a subset of repair facilities, where the subset of repair facilities are select service locations; (xii) present, to the user via the user interface, the subset of repair facilities; (xiii) receive, from the user via the user interface, a selection of one of the repair facilities of the subset of repair facilities; (xiv) determine whether the selected repair facility is a select service location, where a select service location is a pre-authorized repair facility; (xv) if the selected repair facility is a select service location, the at least one processor is further programmed to: (a) transfer the information about the vehicle to a computer device associated with the selected repair facility; (b) request that the user upload one or more photographs of at least one of the vehicle and the damage to the vehicle; (c) receive the one or more photographs from the user computer device; and/or (d) transmit the one or more photographs to the selected repair facility; and/or (xvi) if the selected repair facility is not a select service location, the at least one processor is further programmed to: (a) request, from the user via the user interface, drivability information including whether or not the vehicle is able to be safely driven; (b) if the determination is that the vehicle is not able to be safely driven, schedule a phone call to continue the repair process; and/or (c) if the determination is that the vehicle is able to be safely driven, the at least one processor is further programmed to: (1) present, to the user via the user interface, a search interface to search for an inspection site; (2) receive, from the user via the user interface, a selection of an inspection site; (3) present, to the user via the user interface, a calendar to allow the user to set an appointment with the inspection site; and/or (4) determine an appointment based on the user selections in the user interface and appointment information from a computer device associated with the selected inspection site.

In one aspect, a computer system for instructing a user on repairing a vehicle may be provided. The computer system may include at least one processor (and/or associated transceiver) in communication with at least one memory device. The computer system is in communication with a user computer device associated with the user The at least one processor (and/or associated transceiver) may be configured or programmed to: (i) receive, from the user, a request to repair a vehicle, including information about the vehicle; (ii) present, to the user via the user computer device, a user interface to allow the user to search for a repair facility to repair the vehicle; (iii) receive, from the user via the user interface, a selection of a repair facility; (iv) determine whether the selected repair facility is a select service location, where a select service location is a pre-authorized repair facility; and (v) if the selected repair facility is a select service location, transfer the information about the vehicle to a computer device associated with the selected repair facility to facilitate quickly and efficiently repairing the vehicle. The computer system may have additional, less, or alternate functionality, including that discussed elsewhere herein.

In another aspect, a computer-implemented method for instructing a user on repairing a vehicle may be provided. The method may be implemented on a repair assistant ("RA") computer system including at least one processor in communication with at least one memory device. The RA computer system is further in communication with a user computer device associated with the user. The method may include: (i) receiving, from the user, a request to repair a vehicle, including information about the vehicle; (ii) presenting, to the user via the user computer device, a user interface to allow the user to search for a repair facility to repair the vehicle; (ii) receiving, from user via the user interface, a selection of a repair facility; (iv) determining whether the selected repair facility is a select service location, where a select service location is a pre-authorized repair facility; and (v) if the selected repair facility is a select service location, transferring the information about the vehicle to a computer device associated with the selected repair facility to facilitate quickly and efficiently repairing the vehicle. The method may have additional, less, or alternate functionality, including that discussed elsewhere herein.

In at least one further aspect, at least one non-transitory computer-readable storage media having computer-executable instructions embodied thereon may be provided. When executed by at least one processor, the computer-executable instructions may cause the processor to: (i) receive, from a user, a request to repair a vehicle, including information about the vehicle; (ii) present, to the user via a user computer device, a user interface to allow the user to search for a repair facility to repair the vehicle; (iii) receive, from the user via the user interface, a selection of a repair facility; (iv) determine whether the selected repair facility is a select service location, where a select service location is a pre-authorized repair facility; (v) if the selected repair facility is a select service location, transfer the information about the vehicle to a computer device associated with the selected repair facility; and (vi) if the selected repair facility is not a select service location, the at least one processor is further programmed to: (a) request, from the user via the user interface, drivability information including whether or not the vehicle is able to be safely driven; (b) if the determination is that the vehicle is not able to be safely driven, schedule a phone call to continue the repair process; and (c) if the determination is that the vehicle is able to be safely driven, the at least one processor is further programmed to: (1) present, to the user via the user interface, a search interface to search for an inspection site; and (2) receive, from the user via the user interface, a selection of an inspection site to facilitate quickly and efficiently repairing the vehicle. The computer-executable instructions may have additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
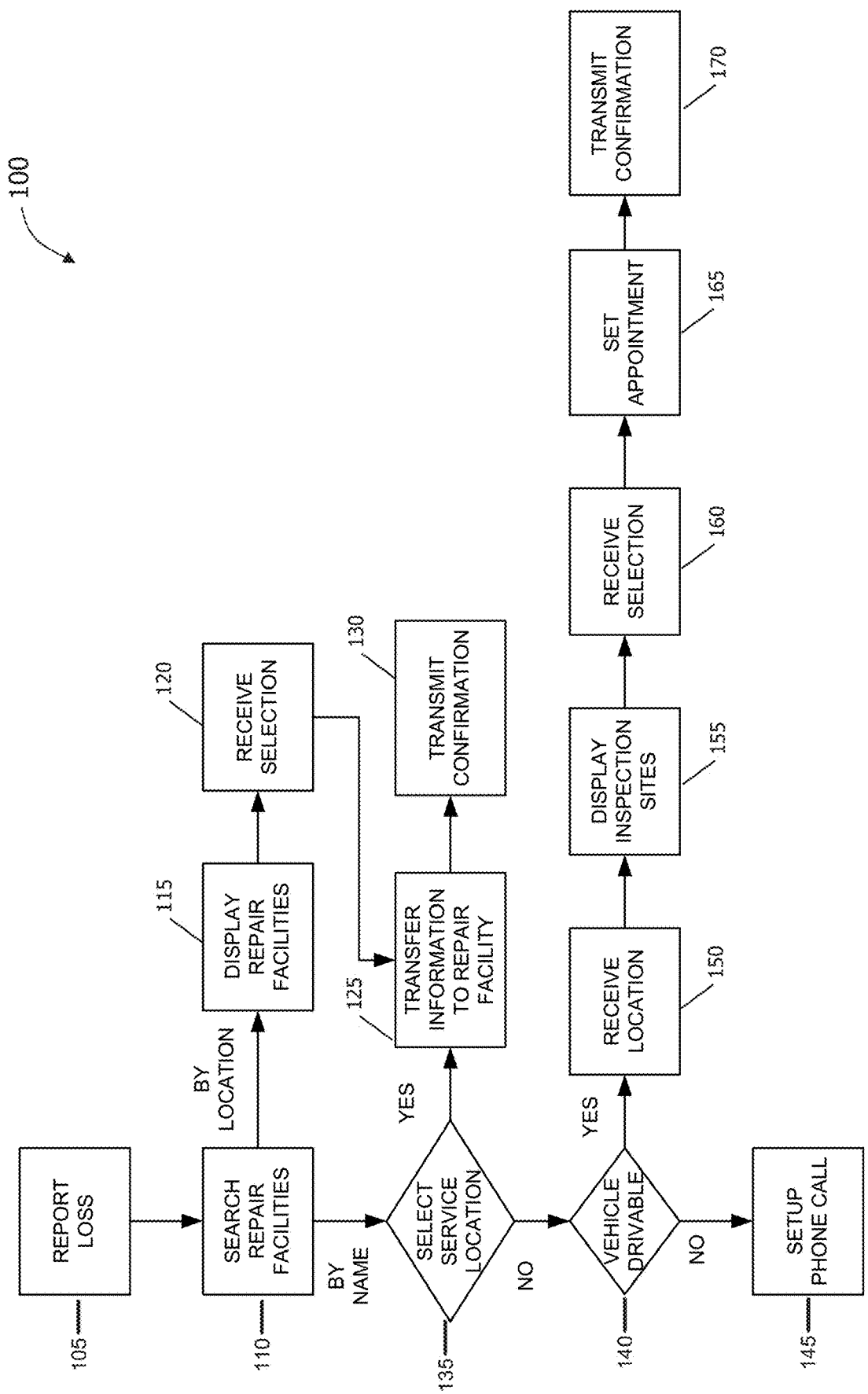
FIG. 1 illustrates a flow chart of an exemplary process of instructing a user in how and where to repair a vehicle, in accordance with the present disclosure.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, systems and methods for instructing a user in how and where to repair a vehicle. In one exemplary embodiment, the process may be performed by a repair assistant ("RA") computer device. In the exemplary embodiment, the RA computer device may be in communication with a user computer device, such as a mobile computer device, insurer network computer devices, one or more repair facilities, and one or more inspection sites. In the exemplary embodiment, the RA computer device is in communication with a user computer device, where the RA computer device transmits data to the user computer device to be displayed to the user and receives the user's inputs from the user computer device.

In the exemplary embodiment, a user reports a loss. This loss may be damage to a vehicle or other object, such as due to a vehicular accident. In other examples, the damage may be due to random chance or Mother Nature, such as hail damage or damage from a falling tree limb. In the exemplary embodiment, the user utilizes a user computer device, such as a mobile computer device, to report the loss. In the exemplary embodiment, the user may utilize an application, or website, associated with an insurance provider to report the loss. In other embodiments, the user may call an insurance agent to report the loss. In the exemplary embodiment, the user provides information about the loss, such as, but not limited to, the make, model, and/or year of the vehicle, the circumstances surrounding the damage, location of the damage on the vehicle, identification of the vehicle, identification of the user, and questions about the current condition of the vehicle. These questions may include, but are not limited to, does the hood open and close freely, does the trunk open and close freely, do all of the doors open and close freely, does the vehicle appear to have any suspension damage, and are any fluids leaking. Additionally, the user indicates whether to not he or she plans to repair vehicle. In some further embodiments, the user may also upload photographs and/or images of the vehicle and/or the damage to the vehicle. In some embodiments, RA computer device may request that the user upload additional photographs for being forwarded to the selected repair facility. Systems for uploading photos of damage to a vehicle and for reviewing those photos to determine the amount of damage to the vehicle based on those photos can be found in U.S. patent application Ser. No. 16/158,137 and U.S. patent application Ser. No. 16/158,118, both filed Oct. 11, 2018, and entitled "SYSTEMS AND METHODS FOR MODEL-BASED ANALYSIS OF DAMAGE TO A VEHICLE." The entire contents and disclosure of both are hereby incorporated by reference herein in their entirety.

In response to reporting the loss, the user is directed to a specialized user interface. In some embodiments, the user may receive an e-mail or text message (such as a short message service (SMS) message or a multimedia messaging service (MMS) message) that includes a link to the specialized user interface. In other embodiments, the user may have reported the loss in an application associated with the insurance provider, where the user had to provide login credentials to access the application. In these embodiments, the application directs the user to the specialized user interface.

In the exemplary embodiment, the user is directed to search for a repair facility to repair the vehicle. The user may search by location or by the name of the repair facility. If the user searches by location, then the user may enter one of, but not limited to, an address, a zip code, a municipality, and a present location of the user computer device. The RA computer device searches one or more databases for repair facilities that are within a predetermined distance of the provided location. The predetermined distance may be set by the user, potentially while performing the search. The predetermined distance may also be set by the RA computer device based on the condition of the vehicle and how safe it is to operate the vehicle and/or by the distance that the vehicle may be towed.

In the exemplary embodiment, the RA computer device filters the display to only display repair facilities that are designated as select service locations. Select service locations are repair facilities that are pre-authorized by the insurance provider to perform repair work. In the exemplary embodiment, these repair facilities have pre-existing relationships with the insurance provider. In some embodiments, the insurance provider has a certification program that it applies to repair facilities to determine whether or not the repair facility qualifies to be a select service location.

The RA computer device displays the repair facilities. In the exemplary embodiment, the RA computer device only displays repair facilities that are considered select service locations. In the exemplary embodiment, the RA computer device displays the repair facilities on a map. In some further embodiments, the map is centered on the location that the user entered. In some embodiments, the user may move the map displayed to see the repair facilities in different areas. The user may also zoom in and out on the map. In other embodiments, the RA computer device may display the repair locations in a list. As an enhancement, each repair location on the list may include the distance between the location that the user entered and the corresponding repair facility. The information next to each repair location may also include, but is not limited to, shop repair specialty, customer ratings, hours of operation, etc.

The RA computer device receives the user's selection of a repair facility from the user computer device. In some embodiments, the RA computer device displays information about the selection and requests that the user confirms the selection. If the user does not confirm the selection, the RA computer device displays the repair facilities and allows the user to make a different selection. Once the RA computer device has received the user's confirmed selection of a repair facility, the RA computer device transfers the information about the loss provided by the user to the repair facility. In the exemplary embodiment, the RA computer device transmits the information about the loss and the user to a computer device associated with the repair facility, such as repair facility computer device. In some further embodiments, the RA computer device assists the user in setting up an appointment with the repair facility to repair the vehicle. Then the RA computer device transmits a confirmation to the user to acknowledge that their vehicle is registered to be repaired by the selected repair facility.

If the user searches by name, then the user may enter part or all of a name of a repair facility. The RA computer device searches one or more databases for repair facilities that match the entered information. In some situations, there may be more than one repair facility that matches, such as in the case of a chain of repair facilities. In these situations, the RA computer device displays all or a portion of repair facilities that match the entered name. In some embodiments, the RA computer device may only display those repair facilities that are within a predetermined distance, a/k/a less than 50 miles from the user's residential or work address. The user may select the repair facility from a list of similarly named facilities and/or from a single selection. If the user does not see the repair facility that they desired on the list, the user may search repair facilities again, either by name or location. In some embodiments, the RA computer device displays information about the selection and requests that the user confirms the selection. If the user does not confirm the selection, the user may search repair facilities again, either by name or location.

In the exemplary embodiment, the RA computer device searches one or more databases to determine whether the selected repair facility is a select service location. As described above, select service locations are repair facilities with a pre-existing relationship with the insurance provider, where the insurance provider has certified and/or pre-authorized the repair facility to perform covered repair on vehicles. If the RA computer device determines that the confirmed repair facility is a select service location, the RA computer device transfers the information about the loss provided by the user to the repair facility. In the exemplary embodiment, the RA computer device transmits the information about the loss and the user to the repair facility computer device. In some further embodiments, the RA computer device assists the user in setting up an appointment with the repair facility to repair the vehicle. Then the RA computer device transmits a confirmation to the user to acknowledge that their vehicle is registered to be repaired by the selected repair facility.

If the RA computer device determines that the confirmed repair facility is not a select service location, the RA computer device determines whether or not the vehicle is drivable. In some embodiments, the RA computer device may ask the user if the vehicle is safe to drive to the selected repair facility. In other embodiments, the RA computer device may determine whether or not the vehicle is safe to drive from the information about the loss that the user provided previously. If the RA computer device determines that the vehicle is not drivable, then the RA computer device sets-up (schedules) a phone call between the user and an insurance agent or other representative of the insurance provider.

If the RA computer device determines that the vehicle is drivable, the RA computer device instructs the user that an inspection of the damage to the vehicle and the vehicle itself is necessary prior to taking the vehicle to the repair facility for repair. The RA computer device requests a location from the user of a location near where the user desires the inspection to take place. This location may be near the current location of the vehicle, the residence of the user, and/or the workplace of the user. The location may be, but is not limited to, an address, a zip code, a municipality, and a present location of the user computer device.

The RA computer device receives the entered location. Based on the entered location, the RA computer device searches for inspection sites within a predetermined distance, at which the vehicle may be inspected. In the exemplary embodiment, the inspection sites may include select service location repair facilities and/or other locations where the insurance provider has set-up inspection sites. The RA computer device displays the inspection sites to the user through the user computer device. The RA computer device receives from the user a selection of an inspection site.

The RA computer device sets an inspection appointment for the vehicle with the user and the inspection site. In the some embodiments, the RA computer device communicates with a computer device associated with the inspection site and retrieves a calendar of appointments, such as inspection site computer device. Then the RA computer device receives a user's selection of a date and time for the appointment and compares the user's selection to the calendar. If there is a conflict, then the RA computer device suggests another time and/or requests that the user select a different time. In other embodiments, the RA computer device transmits the user's selected date and time to the inspection site computer device, where the inspection site computer device determines whether or not to accept the selected date and time for the appointment. Once the appointment is set, the RA computer device transmits a confirmation of the inspection appointment to the user.

While the above describe the object to be repaired as being a vehicle, the object may be one of any other object that needs to be analyzed to determine the amount of damage that the object has sustained. In some further embodiments, the object may be, but is not limited to, a personal possession, such as an antique clock, a piece of artwork, and/or a piece of furniture.

Exemplary Process for Instructing a User in how and where to Repair a Vehicle

FIG. 1 illustrates a flow chart of an exemplary process 100 of instructing a user in how and where to repair a vehicle, in accordance with the present disclosure. In the exemplary embodiment, process 100 is performed by a computer device associated with an insurance provider, such as repair assistant (RA) computer device 310 (shown in FIG. 3). In other embodiments, process 100 is performed by a computer device in communication with an insurance provider. In the exemplary embodiment, RA computer device 310 is in communication with a user computer device, such as a mobile computer device, for example user computer device 305 (shown in FIG. 3). In this embodiment, RA computer device 310 performs process 100 by transmitting data to the user computer device 305 to be displayed to the user and receives the user's inputs from user computer device 305.

In the exemplary embodiment, a user reports 105 a loss. This loss may be damage to a vehicle or other object, such as due to a vehicular accident. In other examples, the damage may be due to random chance or Mother Nature, such as hail damage or damage from a falling tree limb. In the exemplary embodiment, the user utilizes a user computer device 305, such as a mobile computer device, to report 105 the loss. In the exemplary embodiment, the user may utilize an application, or website, associated with an insurance provider to report 105 the loss. In other embodiments, the user may call an insurance agent to report 105 the loss. In the exemplary embodiment, the user provides information about the loss, such as, but is not limited to, the make, model, and/or year of the vehicle, the circumstances surrounding the damage, location of the damage on the vehicle, identification of the vehicle, identification of the user, and questions about the current condition of the vehicle. These questions may include, but are not limited to, does the hood open and close freely, does the trunk open and close freely, do all of the doors open and close freely, does the vehicle appear to have any suspension damage, and are any fluids leaking. Additionally, the user indicates whether to not he or she plans to repair vehicle. In some further embodiments, the user may also upload photographs and/or images of the vehicle and/or the damage to the vehicle. In some embodiments, RA computer device may request that the user upload additional photographs for being forwarded to the selected repair facility.

In response to reporting 105 the loss, the user is directed to a specialized user interface. In some embodiments, the user may receive an e-mail or text message (such as a SMS message or a MMS message) that includes a link to the specialized user interface. In other embodiments, the user may have reported 105 the loss in an application associated with the insurance provider, where the user had to provide login credentials to access the application. In these embodiments, the application directs the user to the specialized user interface.

In the exemplary embodiment, the user is directed to search 110 for a repair facility to repair the vehicle. The user may search 110 by location or by the name of the repair facility. If the user searches 110 by location, then the user may enter one of, but not limited to, an address, a zip code, a municipality, and a present location of the user computer device 305. The RA computer device 310 searches one or more databases for repair facilities that are within a predetermined distance of the provided location. The predetermined distance may be set by the user, potentially while performing the search. The predetermined distance may also be set by the RA computer device 310 based on the condition of the vehicle and how safe it is to operate the vehicle and/or by the distance that the vehicle may be towed.

In the exemplary embodiment, the RA computer device 310 filters the display to only display repair facilities that are designated as select service locations. Select service locations are repair facilities that are pre-authorized by the insurance provider to perform repair work. In the exemplary embodiment, these repair facilities have pre-existing relationships with the insurance provider. In some embodiments, the insurance provider has a certification program that it applies to repair facilities to determine whether or not the repair facility qualifies to be a select service location.

The RA computer device 310 displays 115 the repair facilities. In the exemplary embodiment, the RA computer device 310 only displays 115 repair facilities that are considered select service locations. In the exemplary embodiment, the RA computer device 310 displays 115 the repair facilities on a map. In some further embodiments, the map is centered on the location that the user entered. In some embodiments, the user may move the map displayed to see the repair facilities in different areas. The user may also zoom in and out on the map. In other embodiments, the RA computer device 310 may display 115 the repair locations in a list. As an enhancement, each repair location on the list may include the distance between the location that the user entered and the corresponding repair facility. The information next to each repair location may also include, but is not limited to, shop repair specialty, customer ratings, hours of operation, etc.

The RA computer device 310 receives 120 the user's selection of a repair facility from the user computer device 305. In some embodiments, the RA computer device 310 displays information about the selection and requests that the user confirms the selection. If the user does not confirm the selection, the RA computer device 310 displays 115 the repair facilities and allows the user to make a different selection. Once the RA computer device 310 has received 120 the user's confirmed selection of a repair facility, the RA computer device 310 transfers 125 the information about the loss provided by the user to the repair facility. In the exemplary embodiment, the RA computer device 310 transmits the information about the loss and the user to a computer device associated with the repair facility, such as repair facility computer device 330 (shown in FIG. 3). In some further embodiments, the RA computer device 310 assists the user in setting up an appointment with the repair facility to repair the vehicle. Then the RA computer device 310 transmits 130 a confirmation to the user to acknowledge that their vehicle is registered to be repaired by the selected repair facility.

If the user searches 110 by name, then the user may enter part or all of a name of a repair facility. The RA computer device 310 searches one or more databases for repair facilities that match the entered information. In some situations, there may be more than one repair facility that matches, such as in the case of a chain of repair facilities. In these situations, the RA computer device 310 displays all or a portion of repair facilities that match the entered name. In some embodiments, the RA computer device 310 may only display those repair facilities that are within a predetermined distance, a/k/a less than 50 miles from the user's residential or work address. The user may select the repair facility from a list of similarly named facilities and/or from a single selection. If the user does not see the repair facility that they desired on the list, the user may search 110 repair facilities again, either by name or location. In some embodiments, the RA computer device 310 displays information about the selection and requests that the user confirms the selection. If the user does not confirm the selection, the user may search 110 repair facilities again, either by name or location.

In the exemplary embodiment, the RA computer device 310 searches one or more databases to determine 135 whether the selected repair facility is a select service location. As described above, select service locations are repair facilities with a pre-existing relationship with the insurance provider, where the insurance provider has certified and/or pre-authorized the repair facility to perform covered repair on vehicles. If the RA computer device 310 determines 135 that the confirmed repair facility is a select service location, the RA computer device 310 transfers 125 the information about the loss provided by the user to the repair facility. In the exemplary embodiment, the RA computer device 310 transmits the information about the loss and the user to the repair facility computer device 330. In some further embodiments, the RA computer device 310 assists the user in setting up an appointment with the repair facility to repair the vehicle. Then the RA computer device 310 transmits 130 a confirmation to the user to acknowledge that their vehicle is registered to be repaired by the selected repair facility.

If the RA computer device 310 determines 135 that the confirmed repair facility is not a select service location, the RA computer device 310 determines 140 whether or not the vehicle is drivable. In some embodiments, the RA computer device 310 may ask the user if the vehicle is safe to drive to the selected repair facility. In other embodiments, the RA computer device 310 may determine 140 whether or not the vehicle is safe to drive from the information about the loss that the user provided previously. If the RA computer device 310 determines 140 that the vehicle is not drivable, then the RA computer device 310 sets-up a phone call between the user and an insurance agent or other representative of the insurance provider.

If the RA computer device 310 determines 140 that the vehicle is drivable, the RA computer device 310 instructs the user that an inspection of the damage to the vehicle and the vehicle itself is necessary prior to taking the vehicle to the repair facility for repair. The RA computer device 310 requests a location from the user of a location near where the user desires the inspection to take place. This location may be near the current location of the vehicle, the residence of the user, and/or the workplace of the user. The location may be, but is not limited to, an address, a zip code, a municipality, and a present location of the user computer device 305.

The RA computer device 310 receives 150 the entered location. Based on the entered location, the RA computer device 310 searches for inspection sites within a predetermined distance, at which the vehicle may be inspected. In the exemplary embodiment, the inspection sites may include select service location repair facilities and/or other locations where the insurance provider has set-up inspection sites. The RA computer device 310 displays 155 the inspection sites to the user through the user computer device 305. The RA computer device 310 receives 160 from the user a selection of an inspection site.

The RA computer device 310 sets 165 an inspection appointment for the vehicle with the user and the inspection site. In the some embodiments, the RA computer device 310 communicates with a computer device associated with the inspection site and retrieves a calendar of appointments, such as inspection site computer device 335 (shown in FIG.

3). Then the RA computer device 310 receives a user's selection of a date and time for the appointment and compares the user's selection to the calendar. If there is a conflict, then the RA computer device 310 suggests another time and/or requests that the user select a different time. In other embodiments, the RA computer device 310 transmits the user's selected date and time to the inspection site computer device 335, where the inspection site computer device 335 determines whether or not to accept the selected date and time for the appointment. Once the appointment is set 165, the RA computer device 310 transmits 170 a confirmation of the inspection appointment to the user.

While the above describe the object to be repaired as being a vehicle, the object may be one of any other object that needs to be analyzed to determine the amount of damage that the object has sustained. In some further embodiments, the object may be, but is not limited to, a personal possession, such as an antique clock, a piece of artwork, and/or a piece of furniture.

Figure 2:
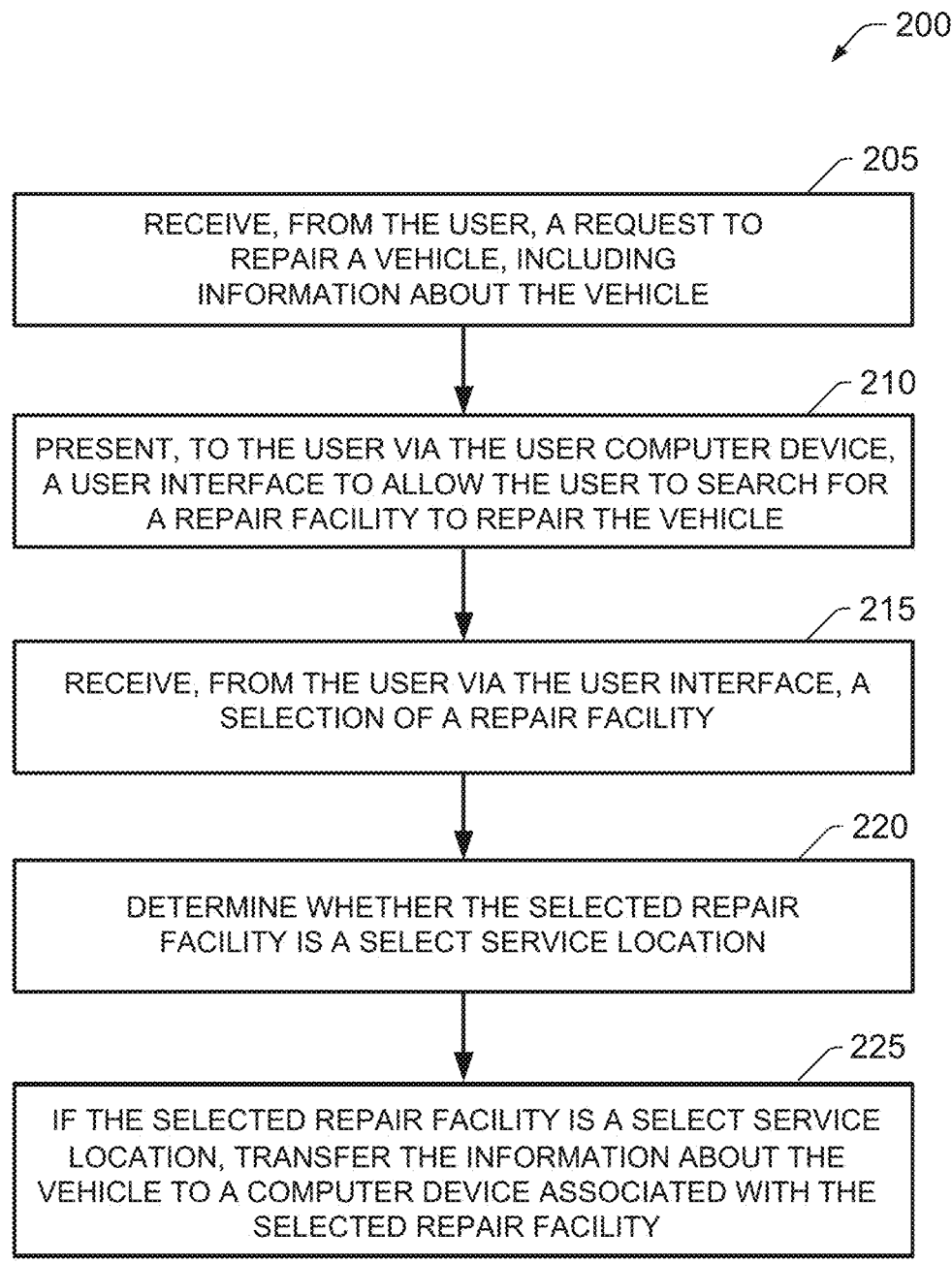
FIG. 2 illustrates a flow chart of an exemplary computer-implemented process for one aspect of the process of instructing a user in how and where to repair a vehicle as shown in FIG. 1, in accordance with the present disclosure.

Exemplary Computer-Implemented Method for Instructing a User in how and where to Repair a Vehicle FIG. 2 illustrates a flow chart of an exemplary computer-implemented process 200 for one aspect of the process 100 of instructing a user in how and where to repair a vehicle as shown in FIG. 1, in accordance with the present disclosure. Process 200 may be implemented by a computing device, for example damage analysis ("RA") computer device 310 (shown in FIG. 3). In the exemplary embodiment, RA computer device 310 may be in communication with a user computer device 305 (shown in FIG. 3), such as a mobile computer device, an insurer network computer device 325 (shown in FIG. 3), one or more repair facility computer devices 330 (shown in FIG. 3), and one or more inspection site computer devices 335 (shown in FIG. 3).

In the exemplary embodiment, RA computer device 310 may receive 205, from the user, a request to repair a vehicle, including information about the vehicle. In the exemplary embodiment, the information about the vehicle includes, but is not limited to, the make, model, and/or year of the vehicle, the circumstances surrounding the damage, location of the damage on the vehicle, identification of the vehicle, identification of the user, and questions about the current condition of the vehicle. These questions may include, but are not limited to, does the hood open and close freely, does the trunk open and close freely, do all of the doors open and close freely, does the vehicle appear to have any suspension damage, and are any fluids leaking. Additionally, the user indicates whether to not he or she plans to repair vehicle. In some further embodiments, the user may also upload photographs and/or images of the vehicle and/or the damage to the vehicle. In some embodiments, RA computer device may request that the user upload additional photographs for being forwarded to the selected repair facility.

In response to the request, RA computer device 310 may present 210, to the user via the user computer device, a user interface to allow the user to search for a repair facility to repair the vehicle. In some embodiments, RA computer device 310 may transmit a link to a user interface, such as in a SMS message, a MMS message, or an email to the user. In other embodiments, the user may login to an application associated with the insurance provider to request the repair. The application may direct the user to the user interface. In the exemplary embodiment, RA computer device 310 transmits information about the user interface to the user computer device 305 and the user computer device 305 displays the user interface to the user. In this embodiment, the user computer device 305 receives inputs from the user and transmits those inputs to RA computer device 310.

In the exemplary embodiment, the user interface allows the user to search for a repair facility based on the name or the location of the facility. RA computer device 310 may receive, from the user via the user interface, a search request including a name of a repair facility. RA computer device 310 may request that the user reenter the name of the repair facility if the name is not recognized. RA computer device 310 may then query one or more databases to recognize the repair facility based on the name. If the name is recognized, RA computer device 310 may retrieve, from the one or more databases, facility information about the repair facility.

RA computer device 310 may receive, from the user via the user interface, a search location for a repair facility, where the search location may be at least one of an address, a zip code, a municipality, and a present location of the user computer device. RA computer device 310 may then query, one or more databases, to determine a plurality of repair facilities within a predetermined distance of the search location. In the exemplary embodiment, RA computer device 310 filters the plurality of repair facilities to generate a subset of repair facilities, where the subset of repair facilities are select service locations. Select service locations are repair facilities that are pre-authorized by the insurance provider to perform repair work. In the exemplary embodiment, these repair facilities have pre-existing relationships with the insurance provider. In some embodiments, the insurance provider has a certification program that it applies to repair facilities to determine whether or not the repair facility qualifies to be a select service location. RA computer device 310 then presents, to the user via the user interface, the subset of repair facilities.

In the exemplary embodiment, RA computer device 310 receives 215, from the user via the user interface, a selection of a repair facility. RA computer device 310 may receive 215, from the user via the user interface, a selection of one of the repair facilities of the subset of repair facilities. Based on the selection, RA computer device 310 determines 220 whether the selected repair facility is a select service location. RA computer device 310 may determine 220, via the one or more databases, whether the repair facility is a select service location based on the facility information provided by one or more databases. If the repair facility was chosen based on the location search, and only select service locations were displayed, RA computer device 310 automatically determines 220 that the repair facility is a select service location.

If the selected repair facility is a select service location, RA computer device 310 transfers 225 the information about the vehicle to a computer device associated with the selected repair facility, such as repair facility computer device 330. In some embodiments, RA computer device 310 transmits a confirmation to the user. RA computer device 310 may also assist the user in setting up an appointment to repair the vehicle.

If the selected repair facility is not a select service location, RA computer device 310 may request, from the user via the user interface, drivability information including whether or not the vehicle is able to be safely driven. If RA computer device 310 determines that the vehicle is not able to be safely driven, RA computer device 310 may schedule a phone call to continue the repair process. In some embodiments, RA computer device 310 may initiate call to an insurance provider agent or representative. In other embodiments, RA computer device 310 may transmit a request for communication to an insurer network computer device 325, wherein the insurer network computer device 325 may initiate a call between the user and a representative of the insurance provider and/or schedule a call in the future. For example, RA computer device 310 may ask the user to enter when the user wishes to be called.

In some embodiments, RA computer device 310 may communicate with one or more insurer network computer devices 325 to setup the call. If RA computer device 310 determines that the vehicle is able to be safely driven, RA computer device 310 may present, to the user via the user interface, a search interface to search for an inspection site. The computer system may also receive, from the user via the user interface, a selection of an inspection site. In some embodiments, RA computer device 310 may present, to the user via the user interface, a calendar to allow the user to set an appointment with the inspection site. RA computer device 310 may also determine an appointment based on the user selections in the user interface and appointment information from a computer device associated with the selected inspection site, such as inspection site computer device 335.

In some embodiments, RA computer device 310 transmits views for the user interface to the user computer device 305. The user computer device 305 is configured to receive and display the views. RA computer device 310 receives user inputs received by the user computer device 305 from the user and transmitted to RA computer device 310.

While the above describe the object to be repaired as being a vehicle, the object may be one of any other object that needs to be analyzed to determine the amount of damage that the object has sustained. In some further embodiments, the object may be, but is not limited to, a personal possession, such as an antique clock, a piece of artwork, and/or a piece of furniture.

Exemplary Computer Network

Figure 3:
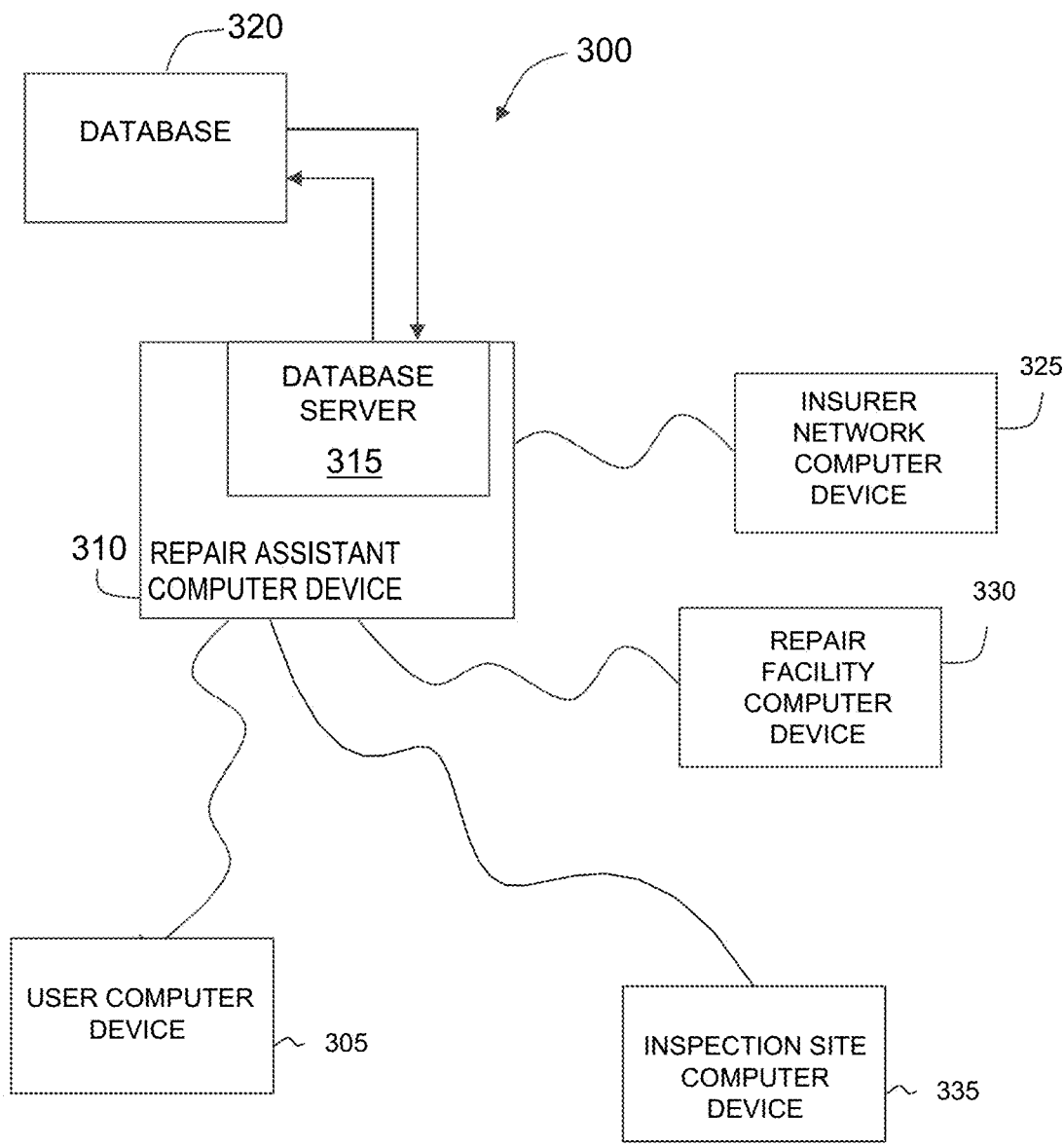
FIG. 3 illustrates a simplified block diagram of an exemplary computer system for implementing the processes shown in FIGS. 1 and 2.

FIG. 3 depicts a simplified block diagram of an exemplary computer system 300 for implementing process 100 shown in FIG. 1 and process 200 shown in FIG. 2. In the exemplary embodiment, computer system 300 may be used for instructing a user in how and where to repair a vehicle. As described below in more detail, a repair assistant ("RA") computer device 310 may be configured to (i) receive, from a user, a request to repair a vehicle, including information about the vehicle; (ii) present, to the user via user computer device 305, a user interface to allow the user to search for a repair facility to repair the vehicle; (iii) receive, from the user via the user interface, a selection of a repair facility; (iv) determine whether the selected repair facility is a select service location, where a select service location is a pre-authorized repair facility; and (v) if the selected repair facility is a select service location, transfer the information about the vehicle to a computer device associated with the selected repair facility.

In the exemplary embodiment, user computer devices 305 are computers that include a web browser or a software application, which enables user computer devices 305 to access remote computer devices, such as RA computer device 310 and insurer network computer devices 325, using the Internet or other network. More specifically, user computer devices 305 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. User computer devices 305 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In some embodiments, user computer device 305 is in communication with a camera. In some of these embodiments, the camera is integrated into user computer device 305. In other embodiments, the camera is a separate device that is in communication with user computer device 305, such as through a wired connection, i.e. a universal serial bus (USB) connection.

A database server 315 may be communicatively coupled to a database 320 that stores data. In one embodiment, database 320 may include vehicle information, select service locations, inspection sites, and repair facility information. In the exemplary embodiment, database 320 may be stored remotely from RA computer device 310. In some embodiments, database 320 may be decentralized. In the exemplary embodiment, the user may access database 320 via user computer device 305 by logging onto RA computer device 310, as described herein.

RA computer device 310 may be communicatively coupled with one or more user computer devices 305. In some embodiments, RA computer device 310 may be associated with, or is part of a computer network associated with an insurance provider, or in communication with insurer network computer devices 325. In other embodiments, RA computer device 310 may be associated with a third party and is merely in communication with the insurer network computer devices 325. More specifically, RA computer device 310 is communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem.

RA computer device 310 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In the exemplary embodiment, RA computer device 310 hosts an application or website that allows the user to access the functionality described herein. In some further embodiments, user computer device 305 includes an application that facilitates communication with RA computer device 310.

In the exemplary embodiment, insurer network computer devices 325 include one or more computer devices associated with an insurance provider. In the exemplary embodiment, insurance provider is associated with the user and the user has an insurance policy that insures the object with insurance provider. In the exemplary embodiment, insurer network computer devices 325 include a web browser or a software application, which enables insurer network computer devices 325 to access remote computer devices, such as RA computer device 310 and database server 315, using the Internet or other network. More specifically, insurer network computer devices 325 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Insurer network computer devices 325 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In some embodiments, insurer network computer devices 325 may access database 320 to select service locations, inspection sites, and/or repair facility information.

In the exemplary embodiment, repair facility computer devices 330 include computer devices associated with repair facilities capable of repairing object. In the exemplary embodiment, repair facility computer devices 330 include a web browser or a software application, which enables repair facility computer devices 330 to access remote computer devices, such as RA computer device 310, using the Internet or other network. More specifically, repair facility computer devices 330 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Repair facility computer devices 330 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In some embodiments, repair facility computer devices 330 may communicate with RA computer device 310 to schedule repair appointments. In some embodiments, repair facilities also function as inspection sites. In these embodiments, repair facility computer devices 330 may communicate with RA computer device 310 to schedule inspection appointments. Repair facility computer devices 330 may communicate with database 320 to retrieve information about the vehicle to be repaired.

In the exemplary embodiment, inspection site computer devices 335 include computer devices associated with inspection sites capable of inspecting the damage to the object. In the exemplary embodiment, inspection site computer devices 330 include a web browser or a software application, which enables inspection site computer devices 335 to access remote computer devices, such as RA computer device 310, using the Internet or other network. More specifically, inspection site computer devices 335 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Inspection site computer devices 335 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In some embodiments, inspection site computer devices 335 may communicate with RA computer device 310 to schedule inspection appointments. Inspection site computer devices 335 may communicate with database 320 to retrieve information about the vehicle to be inspected.

Exemplary Client Device

Figure 4:
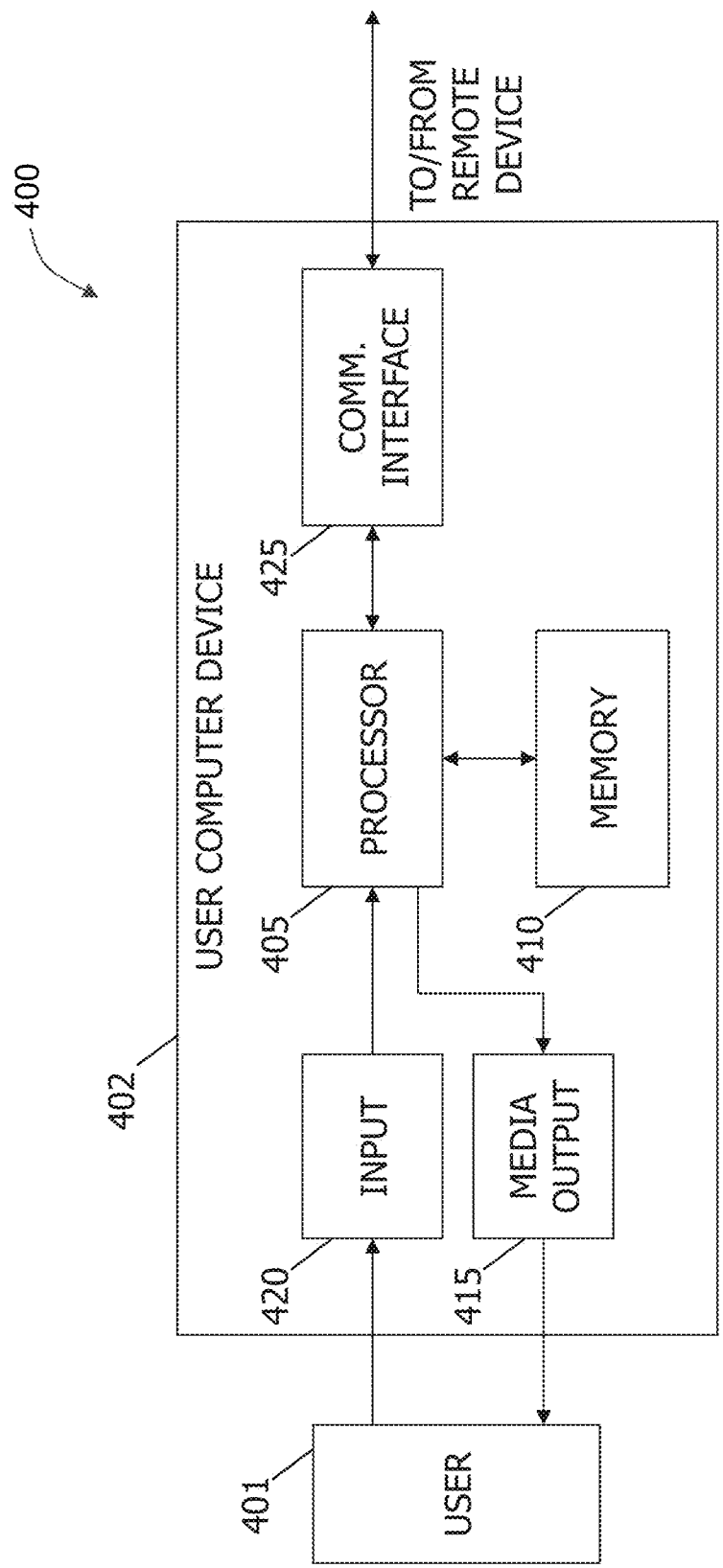
FIG. 4 illustrates an exemplary configuration of a user computer device, in accordance with one embodiment of the present disclosure.

FIG. 4 depicts an exemplary configuration 400 of user computer device 402, in accordance with one embodiment of the present disclosure. In the exemplary embodiment, user computer device 402 may be similar to, or the same as, user computer device 305 (shown in FIG. 3). User computer device 402 may be operated by a user 401. User computer device 402 may include, but is not limited to, user computer devices 305, insurer network computer devices 325, repair facility computer devices 330, and inspection site computer devices 335 (all shown in FIG. 3). User computer device 402 may include a processor 405 for executing instructions. In some embodiments, executable instructions may be stored in a memory area 410. Processor 405 may include one or more processing units (e.g., in a multi-core configuration). Memory area 410 may be any device allowing information such as executable instructions and/or transaction data to be stored and retrieved. Memory area 410 may include one or more computer readable media.

User computer device 402 may also include at least one media output component 415 for presenting information to user 401. Media output component 415 may be any component capable of conveying information to user 401. In some embodiments, media output component 415 may include an output adapter (not shown) such as a video adapter and/or an audio adapter. An output adapter may be operatively coupled to processor 405 and operatively coupleable to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 415 may be configured to present a graphical user interface (e.g., a web browser and/or a client application) to user 401. A graphical user interface may include, for example, an interface for viewing repair facility locations. In some embodiments, user computer device 402 may include an input device 420 for receiving input from user 401. User 401 may use input device 420 to, without limitation, select a repair facility and/or inspection site.

Input device 420 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 415 and input device 420.

User computer device 402 may also include a communication interface 425, communicatively coupled to a remote device such as RA computer device 310 (shown in FIG. 3). Communication interface 425 may include, for example, a wired or wireless network adapter and/or a wireless data transceiver for use with a mobile telecommunications network.

Stored in memory area 410 are, for example, computer readable instructions for providing a user interface to user 401 via media output component 415 and, optionally, receiving and processing input from input device 420. A user interface may include, among other possibilities, a web browser and/or a client application. Web browsers enable users, such as user 401, to display and interact with media and other information typically embedded on a web page or a website from RA computer device 310. A client application may allow user 401 to interact with, for example, RA computer device 310. For example, instructions may be stored by a cloud service, and the output of the execution of the instructions sent to the media output component 415.

Exemplary Server Device

Figure 5:
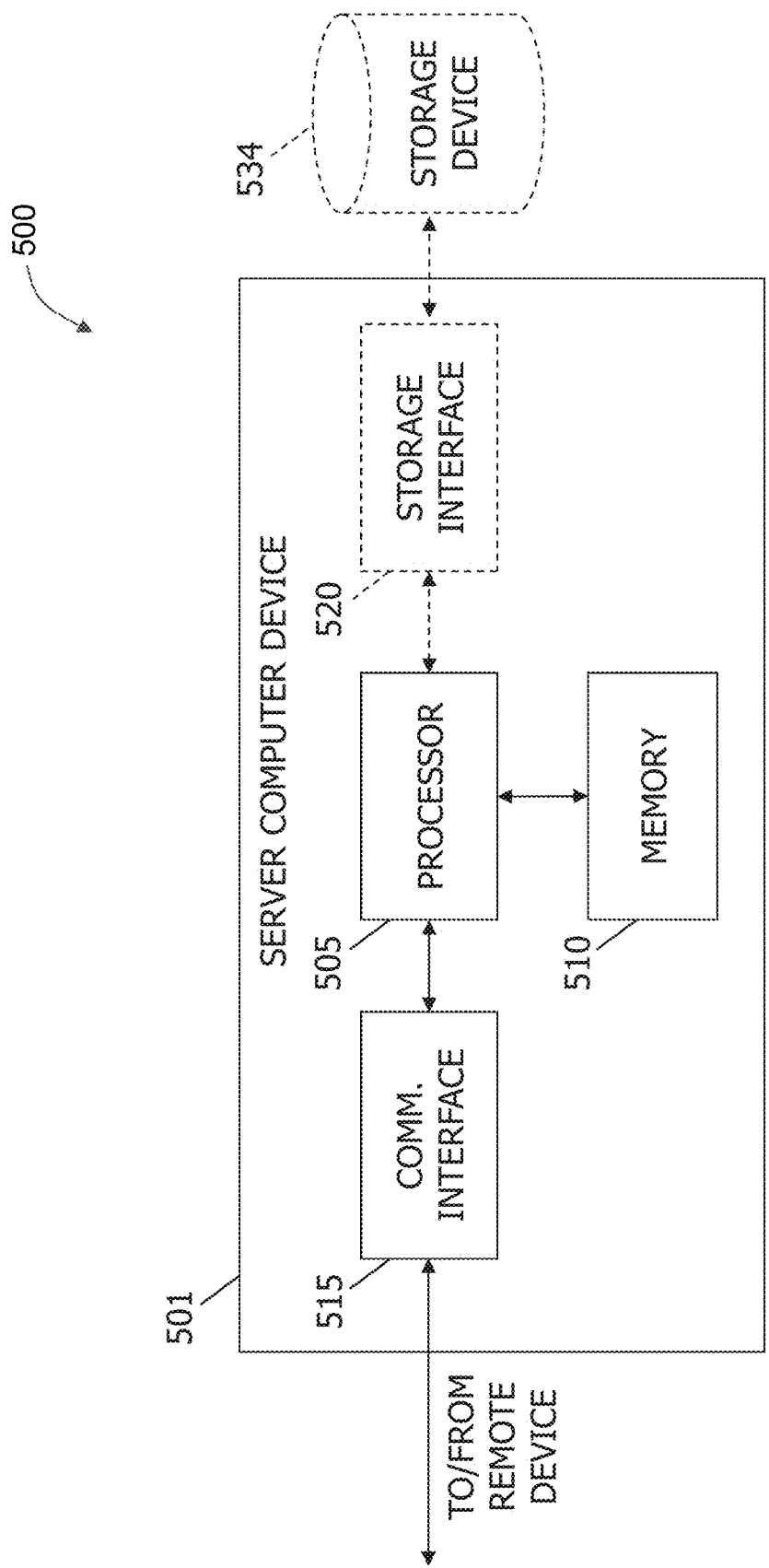
FIG. 5 illustrates an exemplary configuration of a server computer device, in accordance with one embodiment of the present disclosure.

FIG. 5 depicts an exemplary configuration 500 of a server computer device 501, in accordance with one embodiment of the present disclosure. In the exemplary embodiment, server computer device 501 may be similar to, or the same as, RA computer device 310 (shown in FIG. 3). Server computer device 501 may include, but is not limited to, RA computer device 310, insurer network computer devices 325, repair facility computer device 330, inspection site computer device 335, and database server 315 (all shown in FIG. 3). Server computer device 501 may also include a processor 505 for executing instructions. Instructions may be stored in a memory area 510. Processor 505 may include one or more processing units (e.g., in a multi-core configuration).

Processor 505 may be operatively coupled to a communication interface 515 such that server computer device 501 is capable of communicating with a remote device such as another server computer device 501, RA computer device 310, insurer network computer devices 325, repair facility computer device 330, inspection site computer device 335, and user computer devices 305 (shown in FIG. 3) (for example, using wireless communication or data transmission over one or more radio links or digital communication channels). For example, communication interface 515 may receive requests from user computer devices 305 via the Internet, as illustrated in FIG. 3.

Processor 505 may also be operatively coupled to a storage device 534. Storage device 534 may be any computer-operated hardware suitable for storing and/or retrieving data, such as, but not limited to, data associated with database 320 (shown in FIG. 3). In some embodiments, storage device 534 may be integrated in server computer device 501. For example, server computer device 501 may include one or more hard disk drives as storage device 534.

In other embodiments, storage device 534 may be external to server computer device 501 and may be accessed by a plurality of server computer devices 501. For example, storage device 534 may include a storage area network (SAN), a network attached storage (NAS) system, and/or multiple storage units such as hard disks and/or solid state disks in a redundant array of inexpensive disks (RAID) configuration.

In some embodiments, processor 505 may be operatively coupled to storage device 534 via a storage interface 520. Storage interface 520 may be any component capable of providing processor 505 with access to storage device 534. Storage interface 520 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 505 with access to storage device 534.

Processor 505 may execute computer-executable instructions for implementing aspects of the disclosure. In some embodiments, the processor 505 may be transformed into a special purpose microprocessor by executing computer-executable instructions or by otherwise being programmed. For example, the processor 505 may be programmed with the instruction such as illustrated in FIGS. 1 and 2.

Exemplary Computer Device

Figure 6:
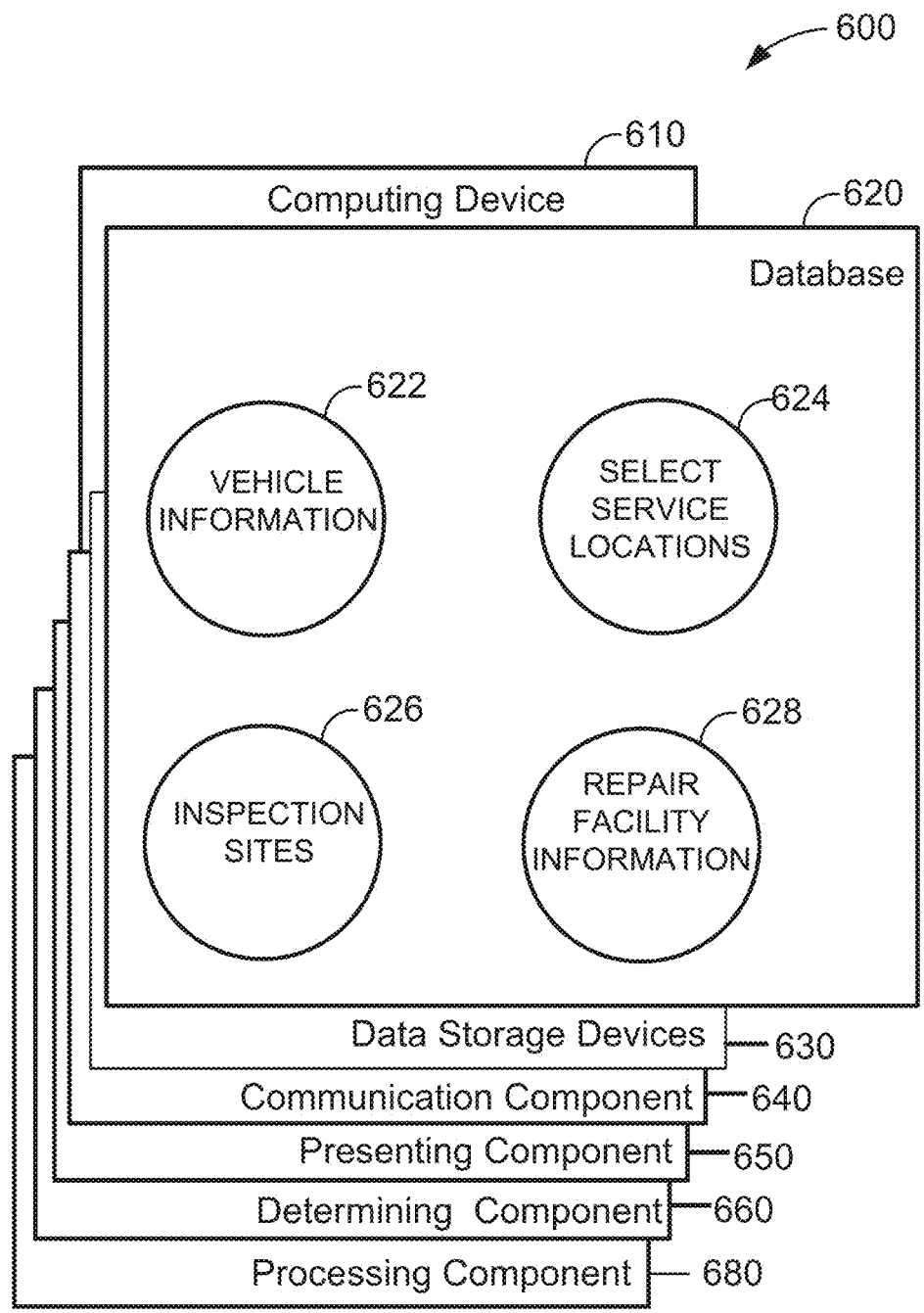
FIG. 6 illustrates a diagram of components of one or more exemplary computing devices that may be used in the system shown in FIG. 3.

FIG. 6 depicts a diagram 600 of components of one or more exemplary computing devices 610 that may be used in system 300 shown in FIG. 3. In some embodiments, computing device 610 may be similar to RA computer device 310. Database 620 may be coupled with several separate components within computing device 610, which perform specific tasks. In this embodiment, database 620 may include vehicle information 622, select service locations 624, inspection sites 626, and repair facility information 628. In some embodiments, database 620 is similar to database 320 (shown in FIG. 3).

Computing device 610 may include the database 620, as well as data storage devices 630. Computing device 610 may also include a communication component 640 for receiving 205 a request to repair a vehicle, receiving 215 a selection of a repair facility, and transferring 225 the information about the vehicle (all shown in FIG. 2). Computing device 610 may further include a presenting component 650 for presenting 210 a user interface (shown in FIG. 2). Moreover, computing device 610 may include a determining component 660 for determining 220 whether the selected repair facility is a select service location (shown in FIG. 2). A processing component 670 may assist with execution of computer-executable instructions associated with the system.

Exemplary User Interface

Figure 7:
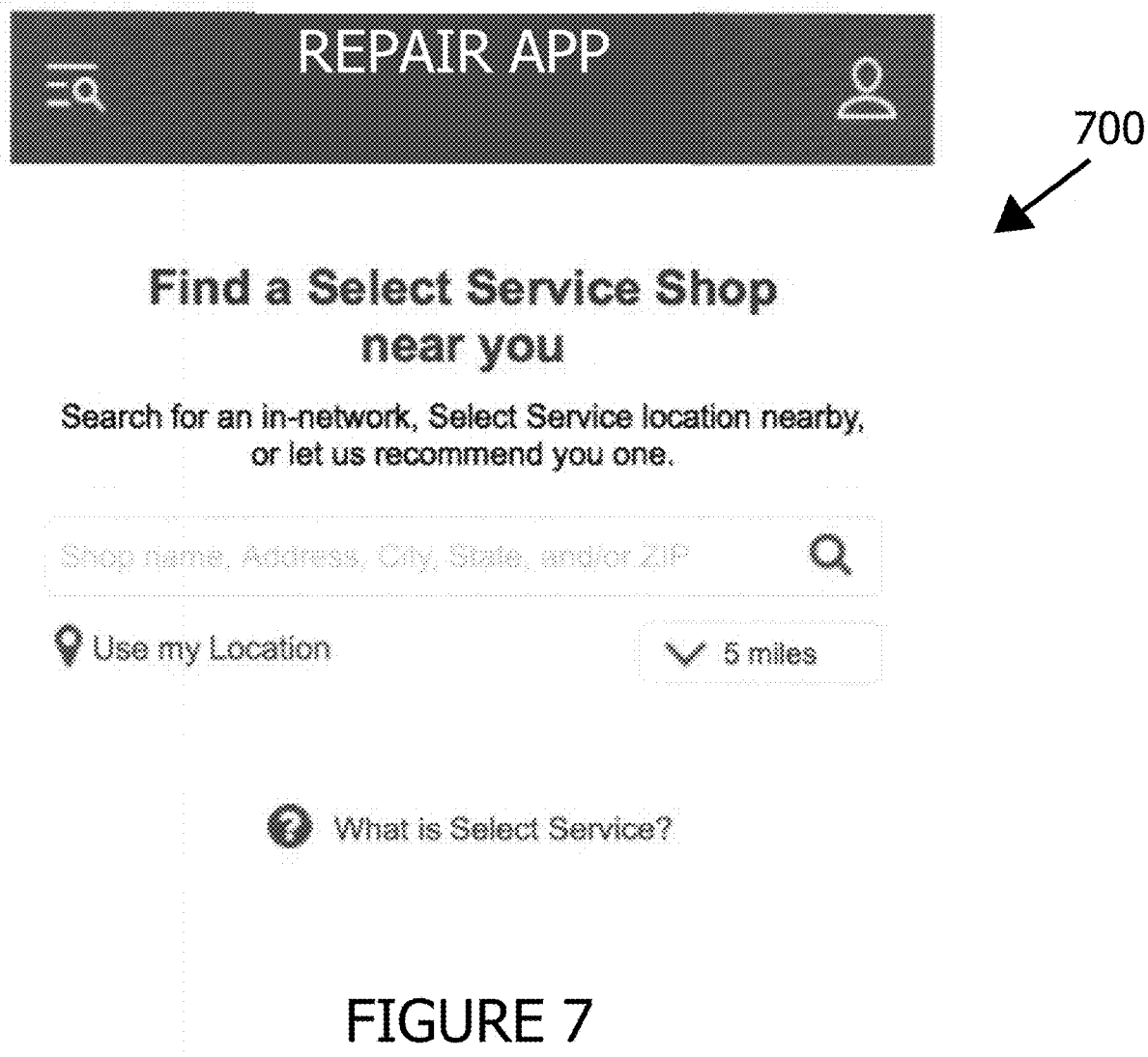
FIG. 7 illustrates a view of a user interface for allowing the user to search for a repair facility using the system shown in FIG. 3.

FIG. 7 illustrates a view 700 of a user interface for allowing the user to search for a repair facility using system 300 (shown in FIG. 3). In the exemplary embodiment, view 700 of user interface is displayed on user computer device 305 (shown in FIG. 3).

View 700 displays a search bar for allowing a user to search for a repair facility, such as described in Step 110 of process 100 (shown in FIG. 1). As described above, the user may enter a shop name, address, city, state, and/or zip code to search for a repair facility. View 700 is similar to the view of the search bar for searching for an inspection site, as described in Step 150 of process 100.

Exemplary User Interface

Figure 8:
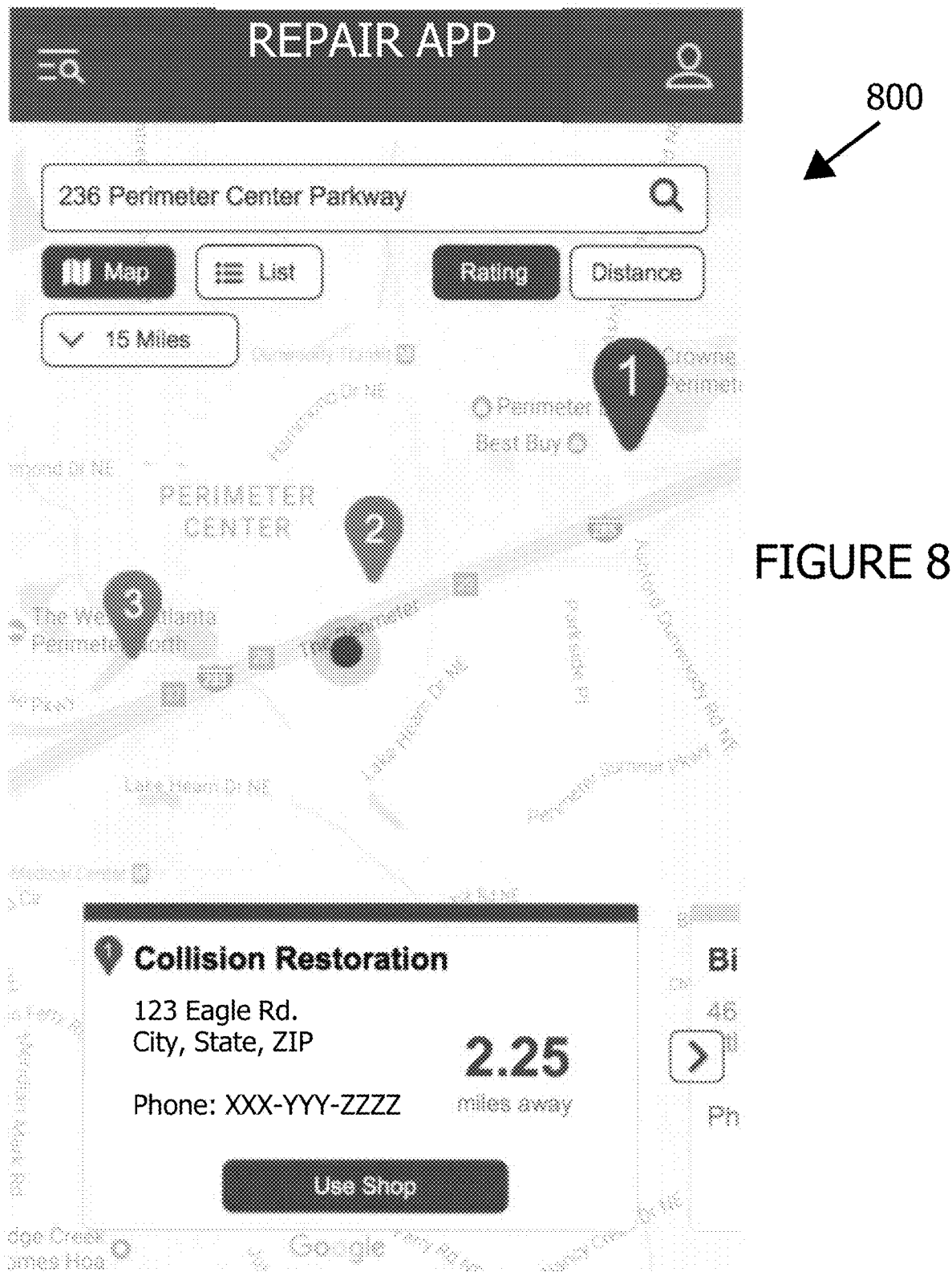
FIG. 8 illustrates a view of a user interface for displaying a map with multiple repair facilities for a user to choose from using the system shown in FIG. 3.

FIG. 8 illustrates a view 800 of a user interface for displaying a map with multiple repair facilities for a user to choose from using system 300 (shown in FIG. 3). In the exemplary embodiment, view 800 of user interface is displayed on user computer device 305 (shown in FIG. 3).

View 800 displays a map including a plurality of repair facilities for the user to select. In view 800, the user has clicked on the first repair facility. The view 800 displays information about the first repair facility and allows the user to select this repair facility by pressing the button labeled "Use Shop." If the user selects a different repair facility, the view 800 will change and display information about that repair facility. This map with selections is also described in Step 115 of process 100 (shown in FIG. 1). View 800 is similar to the view of the map for selecting an inspection site for inspecting the vehicle, as described in Step 155 of process 100. In the exemplary embodiment, entering a location in view 700 causes the user interface to proceed to view 800 to display repair facilities and/or inspection sites within a predetermined distance of the location to be displayed.

Exemplary User Interface

Figure 9:
FIG. 9 illustrates a view of a user interface for displaying a confirmation to a user using the system shown in FIG. 3.

FIG. 9 illustrates a view 900 of a user interface for displaying a confirmation to a user using system 300 (shown in FIG. 3). In the exemplary embodiment, view 900 of user interface is displayed on user computer device 305 (shown in FIG. 3).

View 900 displays a confirmation to the user to acknowledge that their vehicle is registered to be repaired by the selected repair facility. View 900 displays information to the user to allow them to proceed to the selected repair facility, as described in Step 130 of process 100 (shown in FIG. 1). View 900 is similar to the view of the confirmation for setting an appointment for an inspection of the vehicle, as described in Step 170 of process 100.

Exemplary Embodiments & Functionality

In one aspect, a computer system for instructing a user in how and where to repair a vehicle may be provided. The computer system may include at least one processor in communication with at least one memory device. The computer system may be in communication with a user computer device associated with the user. The at least one processor may be configured or programmed to: (1) receive, from the user, a request to repair a vehicle, including information about the vehicle; (2) present, to the user via the user computer device, a user interface to allow the user to search for a repair facility to repair the vehicle; (3) receive, from the user via the user interface, a selection of a repair facility; (4) determine whether the selected repair facility is a select service location, wherein a select service location is a pre-authorized repair facility; and (5) if the selected repair facility is a select service location, transfer the information about the vehicle to a computer device associated with the selected repair facility.

If the selected repair facility is not a select service location, a further enhancement may be where the computer system may request, from the user via the user interface, drivability information including whether or not the vehicle is able to be safely driven. If the determination is that the vehicle is not able to be safely driven, the computer system may schedule a phone call to continue the repair process. In some embodiments, the computer system may initiate call to an insurance provider agent or representative. In other embodiments, the computer system may transmit a request for communication to an insurer network computer device, wherein the insurer network computer device may initiate a call between the user and a representative of the insurance provider and/or schedule a call in the future. For example, the computer system may ask the user to enter when the user wishes to be called. If the determination is that the vehicle is able to be safely driven, the computer system may present, to the user via the user interface, a search interface to search for an inspection site. The computer system may also receive, from the user via the user interface, a selection of an inspection site.

A further enhancement may be where the computer system may present, to the user via the user interface, a calendar to allow the user to set an appointment with the inspection site. The computer system may also determine an appointment based on the user selections in the user interface and appointment information from a computer device associated with the selected inspection site.

The computer system may achieve the above results by receiving, from the user via the user interface, a search request including a name of a repair facility. The computer system may request that the user reenter the name of the repair facility if the name is not recognized. The computer system may then query one or more databases to recognize the repair facility based on the name. If the name is recognized, the computer system retrieves, from the one or more databases, facility information about the repair facility. The computer system may then determine, via the one or more databases, whether the repair facility is a select service location based on the facility information.

The computer system may achieve the above results by receiving, from the user via the user interface, a search location for a repair facility, where the search location may be at least one of an address, a zip code, a municipality, and a present location of the user computer device. The computer system may then query, one or more databases, to determine a plurality of repair facilities within a predetermined distance of the search location. The computer system may filter the plurality of repair facilities to generate a subset of repair facilities, wherein the subset of repair facilities are select service locations. The computer system may also present, to the user via the user interface, the subset of repair facilities and receive, from the user via the user interface, a selection of one of the repair facilities of the subset of repair facilities.

A further enhancement may be where in response to the request to repair the vehicle, the computer system may transmit, to the user computer device, a link to the user interface, wherein the link is transmitted in at least one of a SMS message, an MMS message, and an email message.

A further enhancement may be where the user interface is associated with an application on the user computer device. In this enhancement the user logs into the application to make the request to repair the vehicle.

The computer system may achieve the above results by including the user interface. The computer system may then transmit views for the user interface to the user computer device, where the user computer device is configured to receive and display the views. The computer system may then receive user inputs received by the user computer device from the user and transmitted to the computer system.

A further enhancement may be where the information about the vehicle includes one or more of a make of the vehicle, a model of the vehicle, a year of the vehicle, a location of the damage on the vehicle, identification of the vehicle, and identification of the user.

Machine Learning & Other Matters

The computer-implemented methods discussed herein may include additional, less, or alternate actions, including those discussed elsewhere herein. The methods may be implemented via one or more local or remote processors, transceivers, and/or sensors (such as processors, transceivers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, a reinforced or reinforcement learning module or program, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample (e.g., training) data sets or certain data into the programs, such as image data of objects to be analyzed (e.g., vehicle damage), mobile device data, and/or vehicle telematics data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or other types of machine learning, such as deep learning, reinforced learning, or combined learning.

Supervised and unsupervised machine learning techniques may be used. In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. The unsupervised machine learning techniques may include clustering techniques, cluster analysis, anomaly detection techniques, multivariate data analysis, probability techniques, unsupervised quantum learning techniques, associate mining or associate rule mining techniques, and/or the use of neural networks. In some embodiments, semi-supervised learning techniques may be employed. In one embodiment, machine learning techniques may be used to extract data about the object, vehicle, user, damage, needed repairs, costs and/or incident from vehicle data, insurance policies, geolocation data, image data, and/or other data.

In the exemplary embodiment, a processing element may be trained by providing it with a large sample of repair and vehicle damage data with known characteristics or features. Such information may include, for example, information associated with a shape, size, and/or type of damage as well as the qualifications of various repair facilities and past choices of users related to different repair facilities based on information such as insurance policies, geolocation data, image data, and/or other data.

Based upon these analyses, the processing element may learn how to identify characteristics and patterns that may then be applied to analyzing repair data. For example, the processing element may learn, with the user's permission or affirmative consent, to identify the repair facilities most appropriate for certain types of vehicles and certain types of damages. The processing element may also learn how to identify attributes of different repair facilities that make a user more or less likely to choose that repair facility. This information may be used to determine which repair facilities should be made or qualified as select service locations.

Technical Advantages

The aspects described herein may be implemented as part of one or more computer components such as a client device and/or one or more back-end components, such as a repair assessment engine, for example. Furthermore, the aspects described herein may be implemented as part of a computer network architecture and/or a cognitive computing architecture that facilitates communications between various other devices and/or components. Thus, the aspects described herein address and solve issues of a technical nature that are necessarily rooted in computer technology.

For instance, aspects include analyzing various sources of data to determine damage to an object, such as a vehicle, determine a repair facility to repair the damage, and assist a user in setting up an appointment. In doing so, the aspects overcome issues associated with the inconvenience of manually driving to an inspection facility and requiring multiple inspections prior to repair of the damage. Furthermore, these aspects reduce the number of trips required to travel to a repair facility that may require one trip for the inspection and another trip for the actual repair. Without the improvements suggested herein, additional processing and memory usage would be required to perform such coordination. Additional technical advantages include, but are not limited to: i) improved speed and responsiveness in repairing an object; ii) aligning the owner of the object to be repaired with a repair facility capable of performing the repair; iii) aligning the owner of the object to be repaired with a repair facility that is covered by the insurance provider to perform the repair; iv) efficient transfer of data to the repair facility about the damage prior to arrival at the facility; v) analyzing policies to determine the most efficient repair to the object; and vi) providing an efficient user interface to receive the required data in an efficient and accurate manner. Additional technical advantages are described in other sections of the specification.

Furthermore, the embodiments described herein improve upon existing technologies, and improve the functionality of computers, by more accurately predicting or identifying which repair facilities that a user may select. The present embodiments improve the speed, efficiency, and accuracy in which such calculations and processor analysis may be performed. Due to these improvements, the aspects address computer-related issues regarding efficiency over conventional techniques. Thus, the aspects also address computer related issues that are related to efficiency metrics and ease of use, for example.

Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an exemplary embodiment, the system is executed on a single computer system, without requiring a connection to a sever computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, CA). In yet a further embodiment, the system is run on a Mac OS® environment (Mac OS is a registered trademark of Apple Inc. located in Cupertino, CA). In still yet a further embodiment, the system is run on Android® OS (Android is a registered trademark of Google, Inc. of Mountain View, CA). In another embodiment, the system is run on Linux® OS (Linux is a registered trademark of Linus Torvalds of Boston, MA). The application is flexible and designed to run in various different environments without compromising any major functionality.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A computer system for instructing a user on repairing a vehicle, the computer system comprising at least one processor in communication with at least one memory device, the computer system in communication with a user computer device associated with the user, the at least one processor is programmed to:

receive, by the at least one processor from the user, a request to repair a vehicle, including information about the vehicle;

transmit, from the at least one processor to the user computer device, an electronic message including instructions to display a link to a user interface to be displayed on the user computer device, wherein when the link is activated by the user the link causes additional instructions to be transmitted to the user computer device to display the user interface to be presented to the user of the user computer device;

request, by the at least one processor from the user via the user interface, one or more images of the vehicle based on the information about the vehicle, wherein the request includes instructions for taking the one or more images of the vehicle;

transmit, from the at least one processor to the user computer device, a plurality of instructions to cause the user interface of the user computer device to be updated to allow the user to search for a repair facility to repair the vehicle;

store a machine learning model trained with a large sample of repair and vehicle damage data;

execute the machine learning model using the one or more images of the vehicle, the machine learning model configured to determine damage to the vehicle based on at least the one or more images of the vehicle and to determine one or more repair facilities capable of performing repairs to the damage to the vehicle;

transmit, to the user computer device, one or more additional instructions to display the determined one or more repair facilities capable of performing the repairs to the damages ahead of other repair facilities when presented to the user;

receive, by the at least one processor from the user computer device via the user interface, a selection of a repair facility;

retrieve, by the at least one processor, a calendar of appointments from a repair facility computer device associated with the selected repair facility;

receive, by the at least one processor via the user interface, a user selection of a date and time for an appointment;

compare, by the at least one processor, the user selection of a date and time for the appointment to the calendar of appointments from the repair facility computer device;

transfer, by the at least one processor, the information about the vehicle, the selected date and time, and the one or more images of the vehicle to the repair facility computer device; and receive, by the at least one processor via the user interface, a confirmation of the appointment from the repair facility computer device.

2. The computer system of claim 1, wherein the at least one processor is further programmed to:
- generate, by the at least one processor, a plurality of questions about current conditions of the vehicle;
- transmit, from the at least one processor to the user computer device, a plurality of instructions to cause the user interface of the user computer device to display the plurality of questions about the current conditions of the vehicle; and
- receive, by the at least one processor from the user computer device via the user interface of the user computer device, a plurality of answers about the current conditions of the vehicle in response to the plurality of questions.

3. The computer system of claim 2, wherein the at least one processor is further programmed to generate the plurality of questions about current conditions of the vehicle to include if a hood of the vehicle opens and closes freely, if a trunk of the vehicle opens and closes freely, if doors of the vehicle open and close freely, if the vehicle appears to have any suspension damage, and if any fluids are leaking.

4. The computer system of claim 2, wherein the at least one processor is further programmed to transmit, from the at least one processor to the user computer device, an electronic message including instructions to display a link to a user interface to be displayed on the user computer device, wherein when the link is activated by the user the link causes additional instructions to be transmitted to the user computer device to display the user interface to be presented to the user of the user computer device.

5. The computer system of claim 2, wherein the at least one processor is further programmed to:
- request, by the at least one processor from the user computer device via the user interface, the one or more images of the vehicle based on the plurality of answers, wherein the request includes instructions for taking the one or more images of the vehicle; and
- receive, by the at least one processor from the user computer device via the user interface, the one or more images of the vehicle captured by a camera of the user computer device.

6. The computer system of claim 1, wherein the at least one processor is further programmed to:
- request, by the at least one processor from the user computer device via the user interface, drivability information including whether or not the vehicle is able to be safely driven;
- if the determination is that the vehicle is not able to be safely driven, schedule, by the at least one processor, a phone call to continue the repair process;
- if the determination is that the vehicle is able to be safely driven, the at least one processor is further programmed to:
  - transmit, by the at least one processor to the user computer device via the user interface, instructions to display a search interface to search for an inspection facility;
  - receive, by the at least one processor from the user computer device via the user interface, a selection of an inspection facility;
  - if the determination is that the vehicle is able to be safely driven, the at least one processor is further programmed to:
    - retrieve, by the at least one processor, a calendar of appointments from an inspection facility computer device associated with the selected inspection facility;
    - receive, by the at least one processor via the user interface, a user selection of a date and time for an appointment;
    - present, by the at least one processor to the user computer device via the user interface, a calendar to allow the user to set an inspection appointment with the inspection facility; and
    - determine the inspection appointment based on user selections in the user interface and appointment information from the inspection facility computer device associated with the selected inspection facility.

7. The computer system of claim 1, wherein the at least one processor is further programmed to:
- receive, from the user computer device via the user interface, a search request including a name of a repair facility;
- query one or more databases to recognize the repair facility based on the name;
- if the name is recognized, retrieve, from one or more databases, facility information about the repair facility;
- determine, via the one or more databases, whether the repair facility is a select service location based on the facility information; and
- request that the user reenter the name of the repair facility if the name is not recognized.

8. The computer system of claim 1, wherein the at least one processor is further programmed to:
- receive, from the user computer device via the user interface, a search location for a repair facility, wherein the search location includes at least one of an address, a zip code, a municipality, and a present location of the user computer device;
- query, one or more databases, to determine a plurality of repair facilities within a predetermined distance of the search location;
- filter the plurality of repair facilities to generate a subset of repair facilities, wherein the subset of repair facilities are select service locations;
- present, to the user computer device via the user interface, the subset of repair facilities; and
- receive, from the user computer device via the user interface, a selection of one of the repair facilities of the subset of repair facilities.

9. The computer system of claim 1, wherein in response to the request to repair the vehicle, the at least one processor is further programmed to generate the link to the user interface, wherein the link is transmitted to the user computer device in at least one of a short message service (SMS) message, a multimedia messaging server (MMS) message, and an email message.

10. The computer system of claim 1, wherein the information about the vehicle includes one or more of a make of the vehicle, a model of the vehicle, a year of the vehicle, a location of damage on the vehicle, identification of the vehicle, identification of the user, and the one or more images of the vehicle.

11. The computer system of claim 1, wherein the at least one processor is further programmed to:
- execute the machine learning model to analyze a plurality of answers from a plurality of vehicles and a plurality of selected repair facilities from a plurality of users; and
- determine one or more repair facilities to qualify as select service locations based on the executed machine learning model.

12. The computer system of claim 11, wherein the at least one processor is further programmed to determine one or more attributes that make a user more or less likely to choose a repair facility based on the executed machine learning model.

13. A computer-implemented method for instructing a user on repairing a vehicle, the method implemented on a repair assistant ("RA") computer system comprising at least one processor in communication with at least one memory device, the RA computer system further in communication with a user computer device associated with the user, the method comprising:
- receiving, by the at least one processor from the user, a request to repair a vehicle, including information about the vehicle;
- transmitting, from the at least one processor to the user computer device, an electronic message including instructions to display a link to a user interface to be displayed on the user computer device, wherein when the link is activated by the user the link causes additional instructions to be transmitted to the user computer device to display the user interface to be presented to the user of the user computer device;
- requesting, by the at least one processor from the user via the user interface, one or more images of the vehicle based on the information about the vehicle, wherein the request includes instructions for taking the one or more images of the vehicle;
- transmitting, from the at least one processor to the user computer device, a plurality of instructions to cause the user interface of the user computer device to be updated to allow the user to search for a repair facility to repair the vehicle;
- storing a machine learning model trained with a large sample of repair and vehicle damage data;
- executing the machine learning model using the one or more images of the vehicle, the machine learning model configured to determine damage to the vehicle based on at least the one or more images of the vehicle and to determine one or more repair facilities capable of performing repairs to the damage to the vehicle;
- transmitting, to the user computer device, one or more additional instructions to display the determined one or more repair facilities capable of performing the repairs to the damages ahead of other repair facilities when presented to the user;
- receiving, by the at least one processor from the user computer device via the user interface, a selection of a repair facility;
  - retrieving, by the at least one processor, a calendar of appointments from a repair facility computer device associated with the selected repair facility;
  - receiving, by the at least one processor via the user interface, a user selection of a date and time for an appointment;
  - comparing, by the at least one processor, the user selection of a date and time for the appointment to the calendar of appointments from the repair facility computer device;
  - transferring, by the at least one processor, the information about the vehicle, the selected date and time, and the one or more images of the vehicle to the repair facility computer device; and
  - receiving, by the at least one processor via the user interface, a confirmation of the appointment from the repair facility computer device.

14. The method of claim 13 further comprising:
- generating, by the at least one processor, a plurality of questions about current conditions of the vehicle;
- transmitting, from the at least one processor to the user computer device, a plurality of instructions to cause the user interface of the user computer device to display the plurality of questions about the current conditions of the vehicle; and
- receiving, by the at least one processor from the user computer device via the user interface of the user computer device, a plurality of answers about the current conditions of the vehicle in response to the plurality of questions.

15. The method of claim 14 further comprising transmitting, from the at least one processor to the user computer device, an electronic message including instructions to display a link to a user interface to be displayed on the user computer device, wherein when the link is activated by the user the link causes additional instructions to be transmitted to the user computer device to display the user interface to be presented to the user of the user computer device.

16. The method of claim 14 further comprising:
- requesting, by the at least one processor from the user computer device via the user interface, the one or more images of the vehicle based on the plurality of answers, wherein the request includes instructions for taking the one or more images of the vehicle; and
- receiving, by the at least one processor from the user computer device via the user interface, the one or more images of the vehicle captured by a camera of the user computer device.

17. The method of claim 13 further comprising:
- request, by the at least one processor from the user computer device via the user interface, drivability information including whether or not the vehicle is able to be safely driven;
- if the determination is that the vehicle is not able to be safely driven, schedule, by the at least one processor, a phone call to continue the repair process;
- if the determination is that the vehicle is able to be safely driven, the at least one processor is further programmed to:
  - transmit, by the at least one processor to the user computer device via the user interface, instructions to display a search interface to search for an inspection facility;
  - receive, by the at least one processor from the user computer device via the user interface, a selection of an inspection facility;
- if the determination is that the vehicle is able to be safely driven, the method further comprises:
  - retrieving, by the at least one processor, a calendar of appointments from an inspection facility computer device associated with the selected inspection facility;
  - receiving, by the at least one processor via the user interface, a user selection of a date and time for an appointment;
  - presenting, by the at least one processor to the user computer device via the user interface, a calendar to allow the user to set an inspection appointment with the inspection facility; and
  - determining the inspection appointment based on user selections in the user interface and appointment information from the inspection facility computer device associated with the selected inspection facility.

18. The method of claim 13 further comprising:
receiving, from the user computer device via the user interface, a search request including a name of a repair facility;
querying one or more databases to recognize the repair facility based on the name;
if the name is recognized, retrieving, from the one or more databases, facility information about the repair facility;
determining, via the one or more databases, whether the repair facility is a select service location based on the facility information; and
requesting that the user reenter the name of the repair facility if the name is not recognized.

19. The method of claim 13 further comprising:
receiving, from the user computer device via the user interface, a search location for a repair facility, wherein the search location includes at least one of an address, a zip code, a municipality, and a present location of the user computer device;
querying, one or more databases, to determine a plurality of repair facilities within a predetermined distance of the search location;
filtering the plurality of repair facilities to generate a subset of repair facilities, wherein the subset of repair facilities are select service locations;
presenting, to the user computer device via the user interface, the subset of repair facilities; and
receiving, from the user computer device via the user interface, a selection of one of the repair facilities of the subset of repair facilities.

20. The method of claim 13, wherein in response to the request to repair the vehicle, the method further comprises generating the link to the user interface, wherein the link is transmitted to the user computer device in at least one of a short message service (SMS) message, a multimedia messaging server (MMS) message, and an email message.

21. The method of claim 13, wherein the information about the vehicle includes one or more of a make of the vehicle, a model of the vehicle, a year of the vehicle, a location of damage on the vehicle, identification of the vehicle, identification of the user, and the one or more images of the vehicle.

22. At least one non-transitory computer-readable storage media having computer-executable instructions embodied thereon, wherein when executed by at least one processor in communication with at least one memory device and a user computer device associated with a user, the computer-executable instructions cause the processor to:
receive, by the at least one processor from the user, a request to repair a vehicle, including information about the vehicle;
transmit, from the at least one processor to the user computer device, an electronic message including instructions to display a link to a user interface to be displayed on the user computer device, wherein when the link is activated by the user the link causes additional instructions to be transmitted to the user computer device to display the user interface to be presented to the user of the user computer device;
request, by the at least one processor from the user via the user interface, one or more images of the vehicle based on the information about the vehicle, wherein the request includes instructions for taking the one or more images of the vehicle;
transmit, from the at least one processor to the user computer device, a plurality of instructions to cause the user interface of the user computer device to be updated to allow the user to search for a repair facility to repair the vehicle;
store a machine learning model trained with a large sample of repair and vehicle damage data;
execute the machine learning model using the one or more images of the vehicle, the machine learning model configured to determine damage to the vehicle based on at least the one or more images of the vehicle and to determine one or more repair facilities capable of performing repairs to the damage to the vehicle;
transmit, to the user computer device, one or more additional instructions to display the determined one or more repair facilities capable of performing the repairs to the damages ahead of other repair facilities when presented to the user;
receive, by the at least one processor from the user computer device via the user interface, a selection of a repair facility;
retrieve, by the at least one processor, a calendar of appointments from a repair facility computer device associated with the selected repair facility;
receive, by the at least one processor via the user interface, a user selection of a date and time for an appointment;
compare, by the at least one processor, the user selection of a date and time for the appointment to the calendar of appointments from the repair facility computer device;
transfer, by the at least one processor, the information about the vehicle, the selected date and time, and the one or more images of the vehicle to the repair facility computer device; and
receive, by the at least one processor via the user interface, a confirmation of the appointment from the repair facility computer device; and
if the selected repair facility is not a select service location, the at least one processor is programmed to:
request, by the at least one processor from the user computer device via the user interface, drivability information including whether or not the vehicle is able to be safely driven;
if the determination is that the vehicle is not able to be safely driven, schedule, by the at least one processor, a phone call to continue the repair process; and
if the determination is that the vehicle is able to be safely driven, the at least one processor is further programmed to:
transmit, by the at least one processor to the user computer device via the user interface, instructions to display a search interface to search for an inspection site; and
receive, by the at least one processor from the user computer device via the user interface, a selection of an inspection site.

* * * * *